Oct. 3, 1950     P. S. EVERLEY     2,524,254
CABLE CLAMP
Filed May 19, 1944     2 Sheets-Sheet 1
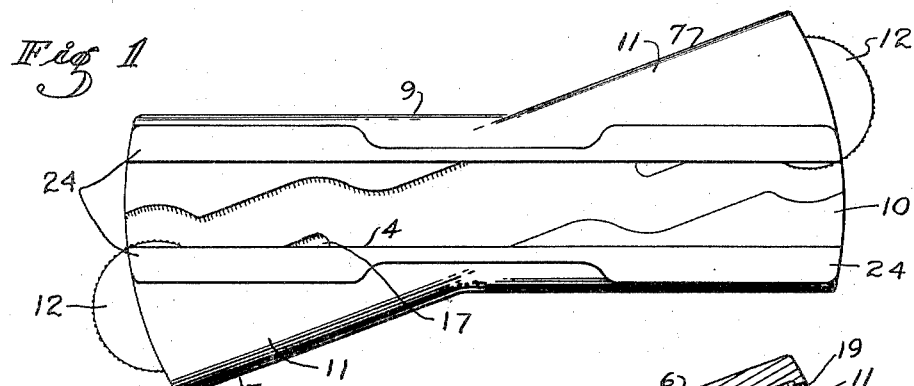
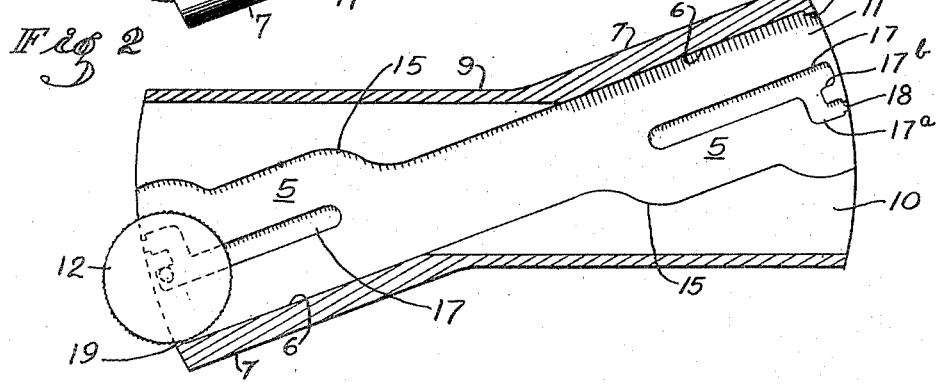
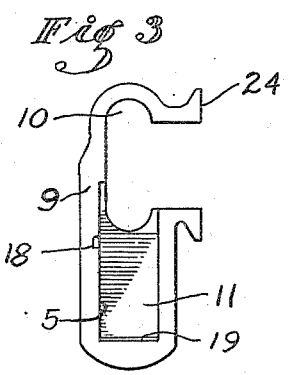
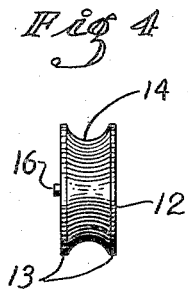
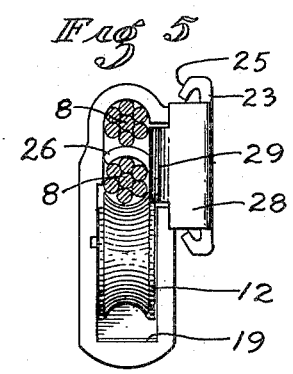
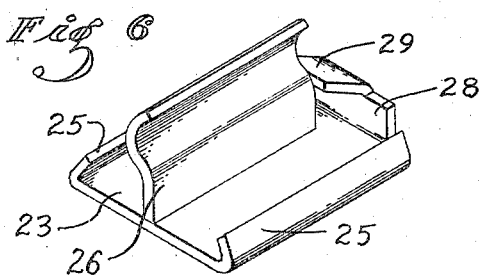
INVENTOR.
PAUL S. EVERLEY
BY Castberg & Roemer
ATTORNEYS

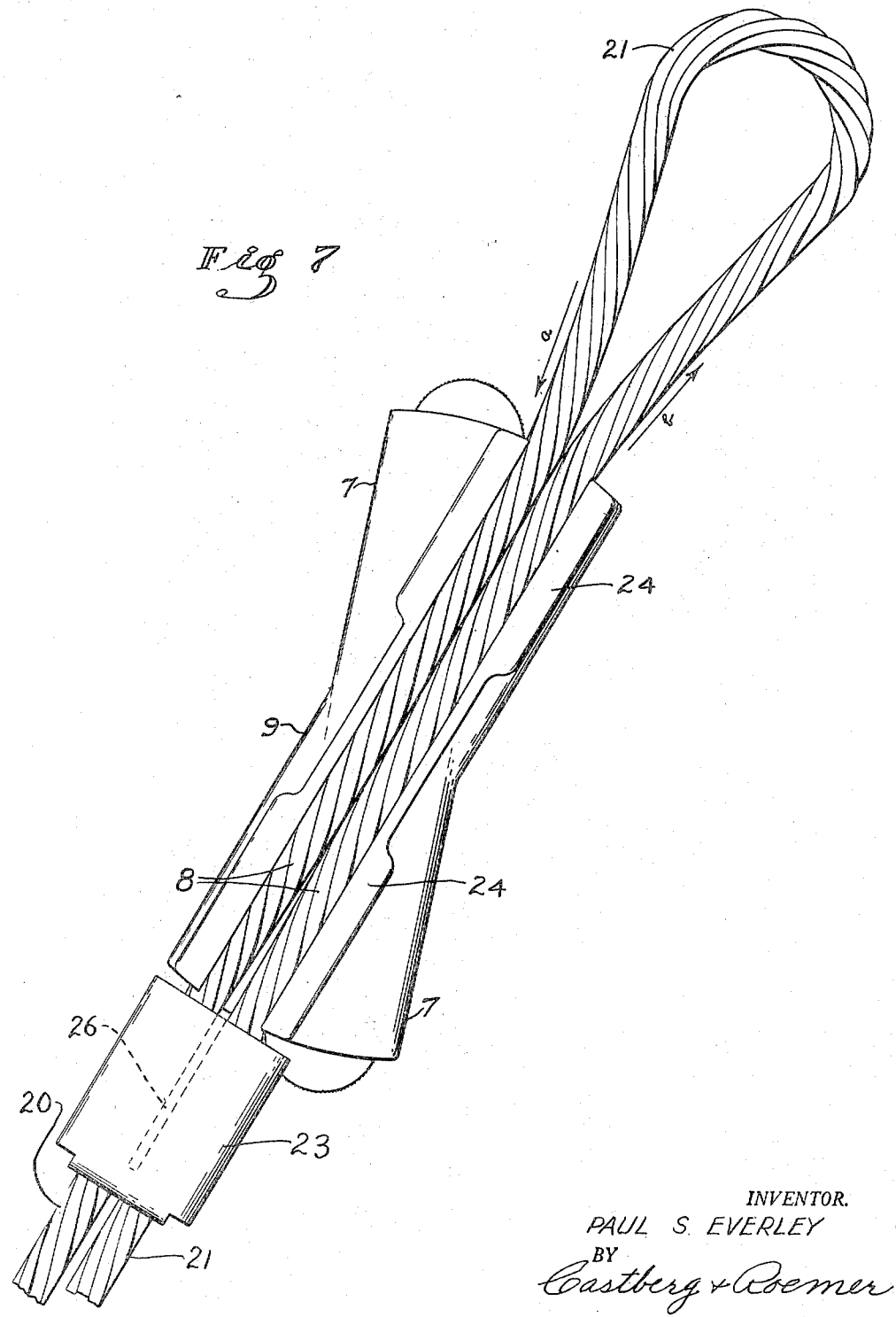

Patented Oct. 3, 1950

2,524,254

UNITED STATES PATENT OFFICE 2,524,254

CABLE CLAMP

Paul S. Everley, San Francisco, Calif.

Application May 19, 1944, Serial No. 536,353

3 Claims. (Cl. 24—136)

The present invention relates to cable clamps, and particularly to clamps used for the purpose of clamping together a pair of parallel strands of cable in which the tension on the cable serves to urge a pair of jamming rollers into positions in which they retain the strands against relative longitudinal movement.

It is the object of the present invention to provide a cable clamp capable of being assembled upon two strands of cable with great facility, and to provide such a clamp having a cable receiving opening throughout its length wide enough to receive two strands of cable at once.

A further object of the invention is to provide closures or cover plates for the opening for which the cable is admitted to the clamp which are easily applied and which carry means to assure that the strands of cable lie properly arranged within the clamp.

A further object of the invention is the provision of a cable clamp having jam rollers which are substantially wider than the cable to be clamped and which may therefore present a relatively large surface for engagement with the cable and to provide means easily inserting the rollers, properly guiding them and preventing their accidental removal from the chambers in which they are housed.

Further objects and advantages of this invention are made apparent in the following specification wherein reference is made to the accompanying drawings illustrating one form which the invention may assume. In the drawings, Fig. 1 is a plan view of a cable clamp embodying the present invention, the cover plates of the clamp being removed;

Fig. 2 is a central longitudinal sectional view of the clamp shown in Fig. 1 with one of the rollers removed;

Fig. 3 is an end elevation of the same clamp with the rollers removed;

Fig. 4 is an end view of one of the rollers;

Fig. 5 is an end elevation of the clamp with the cable strands, rollers and cover plate shown in place thereon;

Fig. 6 is an isometric view of one of the cover plates illustrating details of construction thereof, and Fig. 7 is an assembly view showing the clamp placed upon a pair of cable strands and showing one cover plate in position ready to be moved into place on the clamp.

Referring to the drawings in detail, the cable clamp of the present invention is shown as comprising a housing 9 shaped to form an elongated cable chamber 10 shaped to receive a pair of parallel cable strands 8. At the opposite ends of the housing its sides 7 are flared outwardly to provide a pair of identical roller chambers 11 which are in communication with the cable chamber and which converge toward the center of the cable chamber so that a pair of rollers 12 contained and guided therein will be urged toward the center of the housing and into close contact or jamming relationship with a pair of cable strands therein when tension is applied to the strands in opposite directions.

As illustrated in Figs. 3 and 5, the cable chamber 10 is of a width just to accommodate a pair of cable strands 8 for which the clamp is designed, though strands of slightly smaller size may be effectively clamped therein. The roller chambers 11 are, however, somewhat wider than the cable strands and the cables therein, so that each roller, as shown in Fig. 4, has a pair of flat edges 13 which bear against the back 6 of the roller chamber and at the same time has an intermediate space 14 which is concave to fit the contour of the cable and which is of substantially the same width as the cable strand. Through this arrangement a relatively large surface of the roller is presented for direct engagement with the cable.

Both the edges 13 and the concave central portion 14 of the roller are knurled to prevent slipping of the roller in its chamber 11 and in its area of contact with the cable. The side portion 5 of the roller chamber 11 is as shown in Figs. 1 and 2 restricted in area by a curve 15 which limits the distance that the rollers may advance toward the center of the clamp. The roller is therefore guided and confined by the enlarged portion of the roller chamber. In order that the roller will be retained in the chamber it is provided with a trunnion 16 which extends outwardly from its center at one side only. This trunnion is received by a groove 17 in the side wall of the roller chamber, as best shown at the right side of Fig. 2, which groove communicates with an angular offset groove 17a which leads to the outer edge of the chamber where it is narrower or restricted as indicated at 18. The arrangement of the offset groove 17a is such as to provide a shoulder 17b adjacent to the outer end of groove 17.

The restricted portion 18 of the trunnion receiving groove 17a is slightly smaller in width than the diameter of the trunnion 16, so that in order for it to be inserted, the roller must be held in place with its trunnion ready to enter the restricted portion 18 and then struck a sharp blow with a mallet or similar tool so that it is in effect snapped into place as its trunnion is forced through the narrow point of entry 18. The opening 18 is so narrow that the roller will be constrained against accidental removal from the housing and will be, in fact, retained therein by anything but sufficient force to drive its trunnion through this restricted space. While it is possible to pean the opening 18 with a slight blow of a hammer to further insure against the roller slipping, this is unnecessary for practical purposes as there is no natural force tending to remove the roller from its housing except its own weight which is insufficient to cause the trunnion to pass through the opening 18.

There is a decided advantage in having a single trunnion 16 on the roller 12 because the trunnion groove 17 may be extended on one side of the housing a greater distance than on the other side, thus permitting the roller to advance towards the center of the housing for a greater distance than would be possible if two trunnions were used. For example, in Fig. 1, it may be seen that the groove 17 in the back of the housing exceeds the limit of the front edge 4 of the housing so that the roller may advance farther toward the center of the housing than would be possible if the length of the groove terminated at the edge 4.

In practice, the rollers 12 must be held toward their respective ends of the housing while the cables are being inserted in the cable chamber. In order that each of the rollers may be jammed or wedged temporarily in such a retracted position, a small lug 19 is cast at the outer end of each roller track. Consequently, when the roller is fully retracted it rides up on the lug 19 until its trunnion 16 engages and is forced against the shoulder 17b within the groove 17, assuming the position illustrated in dotted lines at the left hand side of Fig. 2, where it is, in effect, wedged against movement until the protruding portion of the roller is engaged to force it out of this position.

Heretofore, in clamps of this kind no satisfactory method has been devised for inserting the cable strands. Some clamps have been made in which it is necessary to thread the cable through the cable chamber from end to end. This is an awkward, tedious and impractical method of applying the clamp to the cable. Other existing clamps are made of separable halves which in some instances are hinged together, and, in other cases, are joined together after they are placed about the cable strands. In either case, it is necessary in assembling the clamp on to the cable to place one strand in one-half of the clamp and the other strand in the other half and thereafter secure them by whatever means is provided for this purpose.

That such arrangements are impractical in general use is illustrated by Fig. 7 of the drawing wherein the normal position of a cable to which a clamp is to be applied is shown. In Fig. 7 a piece of cable is shown as having one end 20 leading toward the ground where it is securely fastened to a permanent anchor or the like. The cable then is formed into a loop 21 which passes through a thimble or eye or other cable securing means which may be located say at the top of a pole or tower to be guyed by the cable. The free end of the cable is then carried back in the direction indicated at 21 and usually a purchase is taken on this end of the cable with some suitable tackle for drawing it taut thus presenting two parallel strands over which a clamp must be placed, there being no free ends of the cable available. The position of the clamp on these strands is frequently high in the air accessible only from a precarious position on the tower, or from some temporary rigging to support a man in a position for work. It is, therefore, a great advantage to have a cable clamp which has an opening throughout its entire length of sufficient width to accommodate two cable strands at once, and even though the opening may be of just slightly smaller width than the two strands, it is sufficiently wide that the rigger can hold the clamp in one hand and admit both strands to the cable chamber therein by letting one strand lead the other slightly.

When the strands have been inserted in the clamp to occupy the position illustrated in Fig. 7, the rollers may be advanced to their jamming position and when the free end of the cable is released the tension on the two strands assumes the direction of the arrows a and b, so that the tendency for each strand to move draws its respective roller into wedging relationship with the roller housings and into position preventing slipping of the cable strands through the cable housing.

Prior to the final tightening of the cable, however, a pair of cover members shown at 23 in Figs. 5, 6 and 7, are placed over the opening through which the cables are admitted. This opening is provided with outwardly extending flanges 24 adjacent both ends of the housing and the cover plates 23 are, as shown in Figs. 5 and 6, each provided with inwardly flanged edges 25 which embrace the flanges 24 as the cover plate is slid into position. On its inner face the cover plate has a dividing member 26 which extends between the separate strands of the cable chamber occupying the position illustrated in Fig. 5 wherein it is shown as slightly curved to accommodate the contour of one cable strand and thus insure against the strand being forced sideways where it might tend to move out of alignment with the other strand toward the direction of the opening through which the strands are admitted. This dividing member 26 may be welded or suitably secured in place with the cover member. At its rear end each cover plate is provided with an inwardly turned flange 28 which engages the end of the housing to limit the movement of the cover when it slides into place centrally of the edge of the flange 28. It is continued to form a tab 29 which is bent to form an obstruction, which, as shown in Fig. 5, is parallel to the edge of the cable housing and therefore also prevents the cable strands from becoming misaligned and serves as a means carried by the cover and extending into the chamber to confine the strands of the cable to lay in a parallel position.

The cover members 23 may be applied as soon as the strands of cable have been received within the housing and as shown in Fig. 7 each cover member is first positioned to be applied by having its dividing member 26 placed between the cable strands adjacent the end of the housing after which it may be simply moved toward the housing sliding into place with its flanged edges 25 embracing the flanges 24 of the housing.

When the rollers assume their jamming position against the cable, there is a tendency for the housing to spread slightly due to the internal pressure caused by the wedging of the rollers.

This spreading is, of course, limited by the cover member and at the same time the tendency to spread causes a frictional engagement between the housing and the cover members which serves to prevent their accidental removal.

While the cable clamp herein described is of relatively simple construction, and capable of handling very heavy stresses, it has the additional advantage that it may readily be placed over a pair of parallel cable strands without the necessity of pivoting any parts of the cable clamp or in any way changing the shape or position of the cable receiving chamber either before or after the cables are inserted therein.

Through details of construction, herein described, the clamp is made suitable for cables of different diameters. For example, a $\frac{5}{16}''$ or $\frac{3}{8}''$ cable may be clamped with equal efficiency in the same device. The cover members 23 have been shown as relatively short members applied from opposite ends of the housing and covering only that portion of the housing where the cables are actually clamped leaving the intermediate space open. These covers are more easily applied and removed in case of necessity than a single cover throughout the full length of the housing and the space left between the covers permits a tool to be inserted to engage the roller and drive it back out of jamming relationship when the clamp is to be removed. This eliminates the necessity of having slots in the housing designed especially for a tool of this purpose which slots have in some cases been found to weaken the housing and reduce the efficiency of the clamp.

Having thus described my invention what I claim and desire to secure by Letters Patent is:

1. A cable clamp of the character described comprising a single elongated body member having an open ended chamber extending from end to end thereof for the accommodation of a pair of cable strands and having an opening for the admission of cables to said chamber, a cover member for said opening, and a dividing member carried by said cover member and extending into the chamber to lie between the strands of cable therein.

2. A cable clamp of the character described comprising an elongated body member having an open ended chamber for a pair of cable strands, a pair of jamming rollers, one adjacent each end of the housing to engage the cable strands therein said body member having an opening extending the entire length of the chamber for the admission of cable strands, a pair of cover members slidable over said opening from opposite ends thereof, and a dividing member carried by each cover member to lie between the strands of cable in the chamber, each of said dividing members being concavely formed on the side which faces the jamming roller.

3. In a cable clamp of the character described comprising an elongated cable receiving chamber, roller chambers communicating therewith one at each end thereof, a roller in each of said chambers, a trunnion on one side of each roller, the corresponding side of each roller chamber being grooved to receive said trunnion and a restricted portion in said groove opening through the outer edge of the chamber to retain the roller in the chamber and to permit the roller to be forcibly inserted in the chamber.

PAUL S. EVERLEY.

REFERENCES CITED

The following references are of record in the file of this patent:

UNITED STATES PATENTS

| Number | Name | Date |
| --- | --- | --- |
| 1,087,973 | Nurian | Feb. 24, 1914 |
| 1,271,912 | Kemper | July 9, 1918 |
| 1,278,785 | Tainter | Sept. 10, 1918 |
| 1,351,366 | Bowman | Aug. 31, 1920 |
| 1,408,230 | Slaymaker | Feb. 28, 1922 |
| 1,410,759 | Kemper et al. | Mar. 28, 1922 |
| 1,411,730 | Kemper | Apr. 4, 1922 |
| 1,411,731 | Kemper | Apr. 4, 1922 |
| 1,630,880 | Yates | May 31, 1927 |
| 1,665,531 | Cole | Apr. 10, 1928 |
| 1,811,942 | Kemper et al. | June 30, 1931 |
| 2,310,440 | Juslin et al. | Feb. 9, 1943 |